US007887283B1

(12) United States Patent
Mongan

(10) Patent No.: US 7,887,283 B1
(45) Date of Patent: Feb. 15, 2011

(54) WIND TURBINE ASSEMBLY

(76) Inventor: James Michael Mongan, 24351 Condon, Oak Park, MI (US) 48237

(*) Notice: Subject to any disclaimer, the term of this patent is extended or adjusted under 35 U.S.C. 154(b) by 0 days.

(21) Appl. No.: 12/881,698

(22) Filed: Sep. 14, 2010

Related U.S. Application Data

(60) Provisional application No. 61/276,557, filed on Sep. 14, 2009.

(51) Int. Cl.
F03D 7/06 (2006.01)
(52) U.S. Cl. .......................... 415/2.1; 415/71; 415/72; 415/75; 416/227 R; 416/238
(58) Field of Classification Search ................ 415/2.1, 415/71, 72, 75; 416/227 R, 238
See application file for complete search history.

(56) References Cited

U.S. PATENT DOCUMENTS

| 229,270 | A | * | 6/1880 | Perkins | 416/238 |
| 450,417 | A | * | 4/1891 | Marsh et al. | 416/238 |
| 779,473 | A | * | 1/1905 | Freid | 416/242 |
| 1,729,277 | A | * | 9/1929 | Rodgers | 416/238 |
| 4,031,405 | A | | 6/1977 | Asperger | |
| 4,204,796 | A | | 5/1980 | Pack, Jr. | |
| 4,218,175 | A | * | 8/1980 | Carpenter | 415/219.1 |
| 4,365,166 | A | | 12/1982 | Baccini | |
| 5,137,417 | A | * | 8/1992 | Lund | 415/4.1 |
| 7,156,609 | B2 | * | 1/2007 | Palley | 415/4.2 |
| 7,220,105 | B2 | | 5/2007 | Schobinger et al. | |
| 7,365,448 | B2 | | 4/2008 | Stephens | |
| 2009/0110554 | A1 | | 4/2009 | Dukovic | |

* cited by examiner

Primary Examiner—Igor Kershteyn
(74) Attorney, Agent, or Firm—Dickinson Wright, PLLC; Harold W. Milton, Jr.

(57) ABSTRACT

A wind turbine apparatus reactive to fluid flow comprises a turbine assembly (64) rotatably supported for generating energy and a fluid flow control assembly (104, 106, 108, 110, 112) to control fluid flow acting upon the turbine assembly (64). The turbine assembly (64) includes turbine blades (84) that extend from first ends (86) with chords (C) coincident to first end radials (R1) to second ends (88) disposed on second end radials (R2) with the chords (C) coincident to the turbine axis (B). The turbine blades (84) present faces (98) at varying angles of attack between the first end radials (R1) and the turbine axis (B) to always position or present a portion of the turbine blades (84) perpendicularly to fluid flow at various transverse angles to the turbine axis (B). The fluid flow control assembly (104, 106, 108, 110, 112) includes a shield (104) to regulate the fluid flow in a positive flow section (90) and a cover (112) to prevent fluid flow from acting upon the turbine blades (84) in a negative flow section (92).

16 Claims, 4 Drawing Sheets

WIND TURBINE ASSEMBLY

CROSS-REFERENCE TO RELATED APPLICATION

The present invention is a non-provisional of U.S. Application No. 61/276,557 filed Sep. 14, 2009.

BACKGROUND OF THE INVENTION

1. Field of the Invention

A wind turbine apparatus reactive to fluid flow for generating energy.

2. Description of the Prior Art

The wind turbine apparatus of the type to which the subject invention pertains are supported for rotation about a turbine axis and have means for collecting generated energy. One such wind turbine apparatus is illustrated in U.S. Pat. No. 4,204,796 to Pack wherein a turbine assembly is supported for rotation about a vertical turbine axis. This turbine assembly includes a plurality of turbine blades with first ends disposed on spokes extending radially from the turbine axis along chords spaced radially from the turbine axis and extending axially from the first ends back to second ends on the turbine axis at a position spaced axially along the turbine axis from the spokes. This patent also discloses a fluid flow control assembly that controls fluid flow against the turbine blades.

U.S. Pat. No. 7,365,448 to Stephens shows the additional feature of having a turbine assembly with a horizontal turbine axis rotatably supported on a foundation which allows the turbine assembly to rotate about a vertical axis to position the turbine assembly transversely to the fluid flow.

SUMMARY OF THE INVENTION

The invention provides for such a wind turbine apparatus including a turbine blade presenting a face defined by a chord and extending from a first end having the chord coincident to a first end radial to a second end at a varying angle of attack between the first end radial and the turbine axis to position a portion of the turbine blade perpendicularly to fluid flow at various transverse angles to the turbine axis.

ADVANTAGES OF THE INVENTION

A first advantage of the wind turbine apparatus is the allowance for a varied angle of attack where the fluid flow will always act perpendicularly upon some portion of the turbine blade. In addition, the turbine blade can be cut from sheet metal or other sheet goods greatly lowering the cost of manufacture and repair of the wind turbine apparatus.

The next advantage of the wind turbine apparatus is smoother turbine assembly start-up and high speed function over prior-art turbine assembly designs. This wind turbine apparatus allows for reduced drag on the turbine blades as they rotate through the fluid flow control assembly. Further, the fluid flow control assembly permits the turbine assembly to efficiently operate in a wide range of speeds of fluid flow. The shield of the fluid flow control assembly changes position based on speed of the fluid flow thereby keeping turbine blade rotation at a near fixed rate and power generation at a steady voltage. The second of the electric generators will be activated in high speed fluid flow conditions to extend the range of useable speeds of fluid flow. In combination with the shield positions, the second electric generator can produce a higher power output while keeping a steady voltage.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
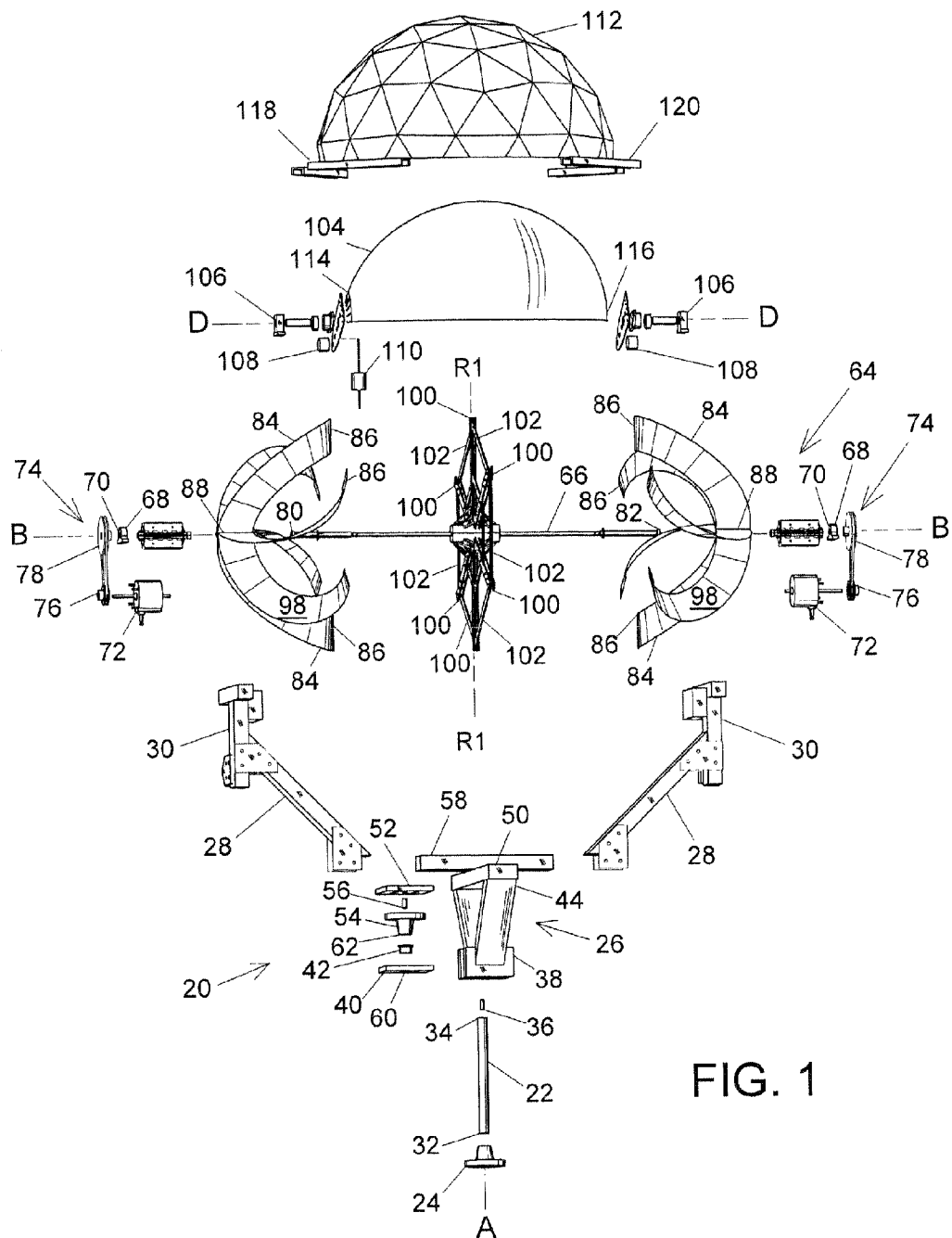
FIG. 1 is a front perspective and fragmentary view showing the wind turbine apparatus.
Figure 2:
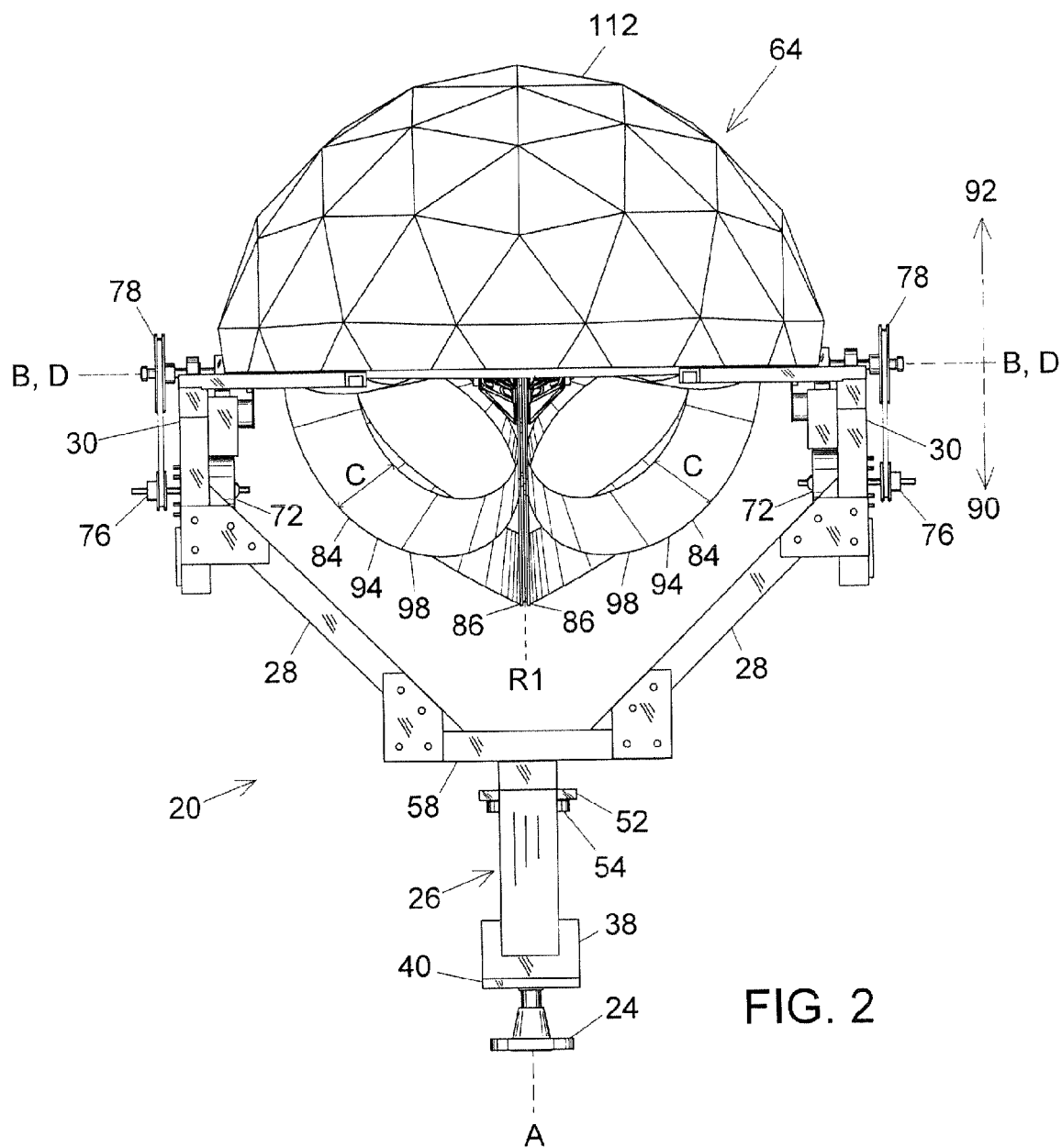
FIG. 2 is a frontal view showing the wind turbine apparatus.
Figure 3:
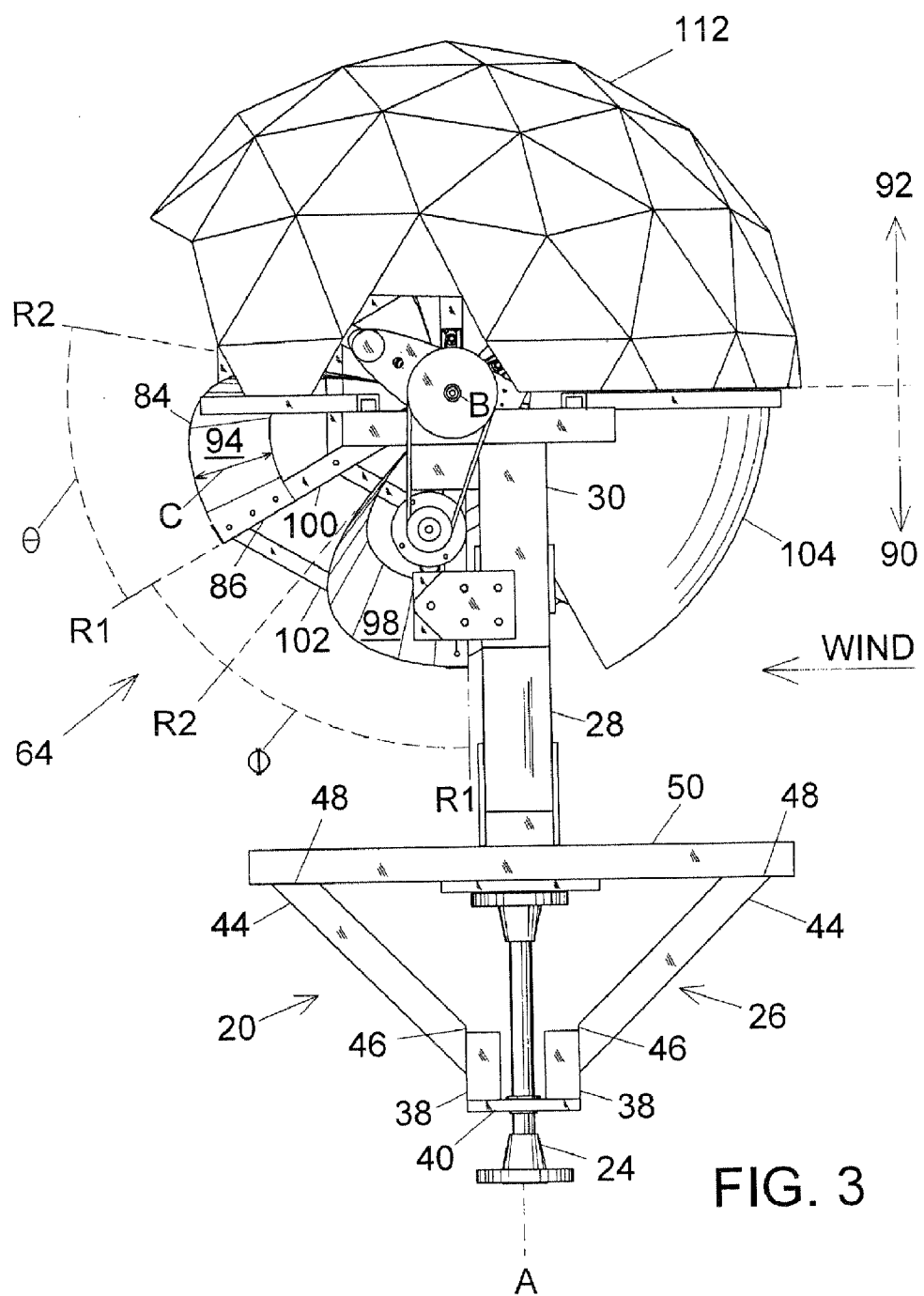
FIG. 3 is a side view showing the wind turbine apparatus.
Figure 4:
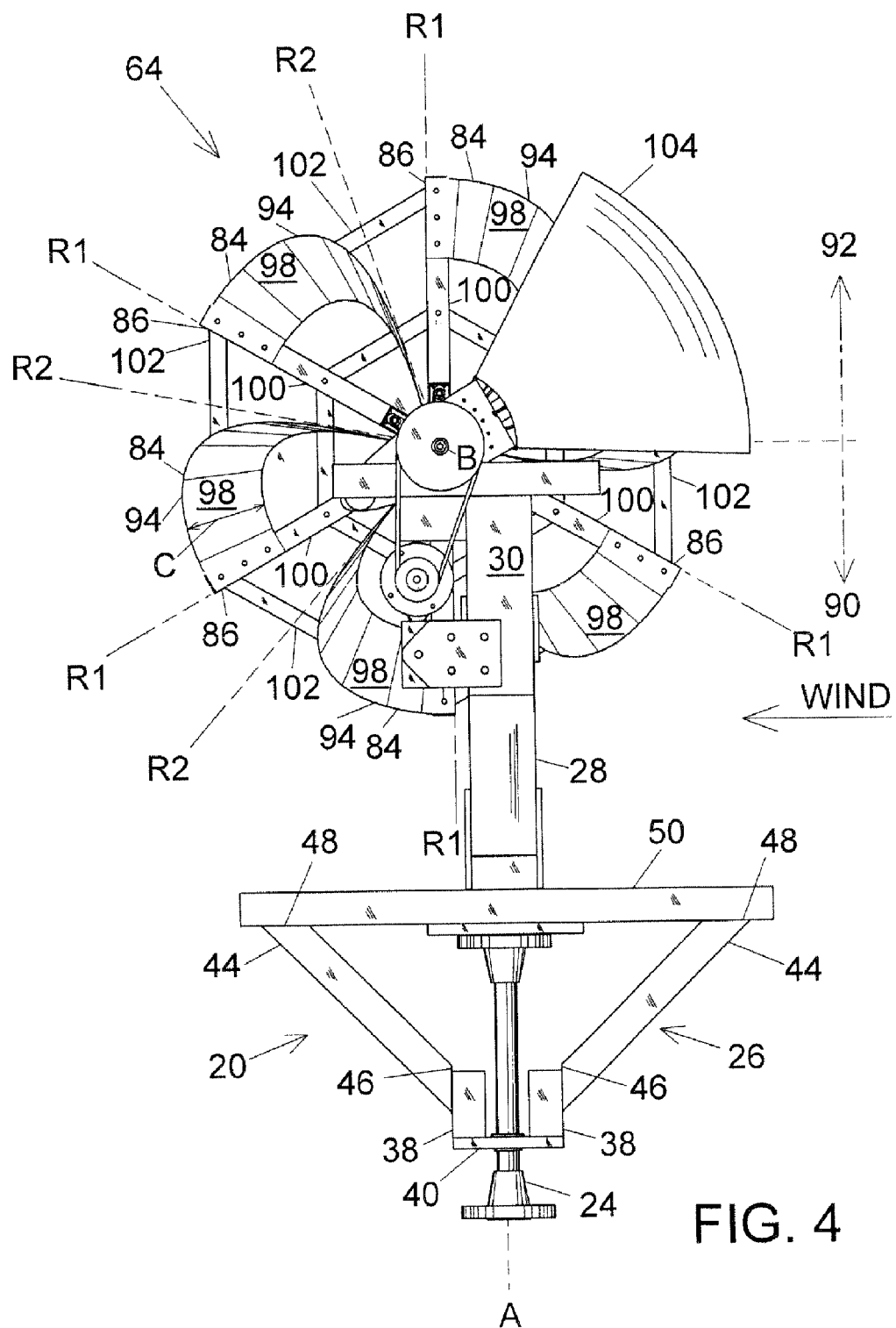
FIG. 4 is a side view of FIG. 3 absent the cover.

Referring to the Figures, wherein like numerals indicate corresponding parts throughout the several views, a wind turbine apparatus reactive to fluid flow for generating energy is constructed in accordance with the subject invention, generally shown, in FIGS. 1, 2, 3, and 4. It should be understood that the term fluid flow is not restrictive and can represent wind, water, or the like.

The wind turbine apparatus comprises a support 20, generally shown, which includes a shaft 22 having a vertical axis A for supporting the wind turbine apparatus on a foundation 24 and a yoke 26, 28 rotatably supported on the shaft 22 for rotation about the vertical axis A. The yoke 26, 28 rotates on the shaft 22 to allow positioning of the wind turbine apparatus transversely to the fluid flow. The shaft 22 is cylindrical in shape having a bottom end 32 affixed to the foundation 24. The shaft 22 extends vertically on the vertical axis A to a top end 34 having a bearing pin 36 disposed on the top end 34 of the shaft 22. The yoke 26, 28 includes a center frame 26, generally indicated, and rotatably supported on the shaft 22 and a pair of arms 28 that extend upwardly in opposite directions from the center frame 26 to spaced rotor mounts 30 each supported by one of the arms 28 of the yoke 26, 28. The center frame 26 and arms 28 are constructed from rigid members with channels that allow interconnection of the structures using fasteners and brackets.

The center frame 26 includes a bushing assembly 38, 40, 42 surrounding the shaft 22 adjacent the bottom end 32 of the shaft 22. A pair of lower truss members 44 extend in opposite diverging directions from lower truss lower ends 46 at the bushing assembly 38, 40, 42 to lower truss upper ends 48. A lower cross beam 50 interconnects the lower truss upper ends 48 and a bearing assembly 52, 54, 56. The bearing assembly 52, 54, 56 is attached to the lower cross beam 50 on the vertical axis A and an upper cross beam 58 extends transversely to and is supported on the lower cross beam 50 downstream relative to the vertical axis A.

The bushing assembly 38, 40, 42 includes a pair of lower support members 38 spaced from one another and connected to the lower truss lower ends 46. A lower mount plate 40 interconnects the lower support members 38. A bushing 42 is affixed to the lower mount plate 40 on the vertical axis A between the lower support members 38 and defines a bushing assembly opening 60 through the lower mount plate 40 and the bushing 42 on the vertical axis A to allow the shaft 22 to pass through the bushing assembly opening 60. The bearing assembly 52, 54, 56 includes an upper mount plate 52 attached to the lower cross beam 50. A bearing 54 is affixed to the upper mount plate 52 on the vertical axis A and defines a bearing assembly opening 62 in the bearing 54 at the vertical axis A. A bearing pin cap 56 is disposed in the bearing assembly opening 62 to engage the bearing pin 36 of the shaft 22 and to support 20 the wind turbine apparatus for rotation about the vertical axis A.

The wind turbine apparatus further includes a turbine assembly 64, generally shown. The turbine assembly 64 includes an axle 66 that extends along a turbine axis B and is supported by a pair of axle bearings 68 affixed to the rotor mounts 30. The axle bearings 68 define a pair of axle openings 70 along the turbine axis B. The axle 66 is operatively connected to a pair of generator assemblies 72, 74. The generator assemblies 72, 74 are supported by the rotor mounts 30 and generate electrical energy during wind turbine apparatus operation, i.e., rotation of the axle 66 is converted into electrical energy by the generator assemblies 72, 74. The generator assemblies 72, 74 include a pair of electric generators 72 connected to the rotor mounts 30 and a pair of pulley systems 74, generally shown, and rotatably interconnecting the electric generators 72 to the axle 66. Each of the pulley systems 74 includes a drive pulley 76 connected to an electric generator 72 and a power take-off pulley 78 connected to the axle 66. The axle 66 is cylindrical in shape and has a first axle end 80 affixed to a first of the power take-off pulleys 78. The axle 66 extends from the first axle end 80 through the axle openings 70 in the axle bearings 68 along the turbine axis B to a second axle end 82 affixed to a second of the power take-off pulleys 78.

The turbine assembly 64 also includes a plurality of turbine blades 84. The turbine blades 84 have first ends 86 disposed on first end radials R1 extending radially from the turbine axis B along chords C with the chords C spaced radially from the turbine axis B. The plurality of blades extend axially in opposite directions from the first ends 86 back to second ends 88 disposed on second end radials R2. The second end radials R2 extend radially from the turbine axis B adjacent to the rotor mounts 30. The turbine assembly 64 has a positive flow section 90 and a negative flow section 92 defined by a transverse horizontal plane extending through the turbine axis B and perpendicular to the vertical axis A. The positive flow section 90 extends from the turbine axis B downward to the yoke 26, 28. The negative flow section 92 extends from the turbine axis B upward to the cover 112 described below. The plurality of turbine blades 84 present concave faces 94 defined by the chords C in the positive flow section 90 and present convex faces 96 defined by the chords C in the negative flow section 92. The fluid flow generates rotational energy when it hits the concave faces 94 in the positive flow section 90, but the fluid flow interferes with the generation of rotational energy when it his the convex faces 96 in the negative flow section 92.

The turbine blades 84 extend from the first ends 86 with the chords C coincident to the first end radials R1 to the second ends 88 disposed on the second end radials R2 with the chords C coincident to the turbine axis B. The turbine blades 84 present faces 98 at varying angles of attack between the first end radials R1 and the turbine axis B to always position or present a portion of the turbine blades 84 perpendicularly to fluid flow at various transverse angles to the turbine axis B, i.e., regardless of the direction of fluid flow across the turbine axis B.

The second end radials R2 are spaced angularly about the turbine axis B by a first angle $\theta$ from the first end radials R1. In other words, the second end 88 of each turbine blade 84 is spaced angularly about the turbine axis B by a first angle $\theta$ from the first end 86 of that turbine blade 84. The first end radials R1 are spaced angularly about the turbine axis B by a second angle $\Phi$ from each other. In the preferred embodiment, the first angle $\theta$ equals forty-five degrees and the second angle $\Phi$ equals sixty degrees, but other angles for $\theta$ and $\Phi$ are envisioned.

The turbine assembly 64 also includes a drive wheel assembly 100, 102, secured to the axle 66 centrally between the rotor mounts 30. The drive wheel assembly 100, 102 includes a plurality of drive wheel spokes 100 that extend radially outward from the axle 66 perpendicularly to the turbine axis B along the first end radials R1, i.e., each drive wheel spoke 100 extends along a first end radial R1. The first ends 86 of the turbine blades 84 are each supported by a drive wheel spoke 100 in the preferred embodiment. The drive wheel assembly 100, 102 also includes a plurality of spoke supports 102 that extend between the drive wheel spokes 100 to provide structural integrity to the drive wheel assembly 100, 102.

Each of the turbine blades 84 extends from the drive wheel assembly 100, 102 to the axle 66 according to the given formula $[x, y, z] = [v \cdot \sin(\pi u/2) \cdot \cos(\pi u/2), v \cdot \sin^2(\pi u/2), v \cdot \cos(\pi u/2)]$ wherein x, y, and z are Cartesian coordinates with the y axis being the turbine axis B and the x and z axes extending radially from the y axis and perpendicularly to each other. The variable u varies to define the angle through which the turbine blades 84 extend from the first ends 86 disposed on the first end radials R1 about the x axis to the second ends 88 disposed on the second end radials R2. The variable v varies from a first value v1 to a last value vx where v1 defines the radial distance along the first end radials R1 to begin the chords C and vx defines the radial distance along the first end radials R1 to end the chords C. The length of the chords C is constant between the first end radials R1 and second end radials R2 albeit the orientation of the chords C changes through the variation in u about the x axis. In the preferred embodiment, the variable u varies by ninety degrees and the turbine blades 84 are connected to the axle 66 using a flexible bracket and fastener combination.

The turbine assembly 64 also includes a fluid flow control assembly 104, 106, 108, 110, 112 to control fluid flow acting upon the turbine blades 84. The fluid flow control assembly 104, 106, 108, 110, 112 includes a shield 104 to regulate fluid flow acting upon the concave faces 94 of the turbine blades 84 in the positive flow section 90 of the turbine assembly 64. A pair of trunnions 106 is supported by the rotor mounts 30 having a trunnion axis D that extends between the trunnions 106 and is concentric to the turbine axis B. The shield 104 is semi-spherically shaped and extends spherically between a first shield end 114 pivotally affixed to a first of the trunnions 106 and a second shield end 116 pivotally affixed to a second of the trunnions 106 to allow the shield 104 to pivot about the trunnion axis D in a plurality of pivot positions. The shield 104 pivots between a first position with the shield 104 being fully nested in the negative flow section 92 of the turbine assembly 64 and a last position with the shield 104 being fully exposed in the positive flow section 90 of the turbine assembly 64. The fluid flow control assembly 104, 106, 108, 110, 112 also includes a pair of counterweights 108 and a controller 110. The pair of counterweights 108 is affixed to the shield 104 adjacent to the trunnions 106 to balance the shield 104 in the plurality of pivot positions. The controller 110 is affixed to the shield 104 between one of the trunnions 106 and one of the counterweights 108 to allow for electronic control of the shield 104 by an external operator of the wind turbine apparatus.

The fluid flow control assembly 104, 106, 108, 110, 112 also includes a cover 112 that is supported by and extends between the rotor mounts 30 to prevent fluid flow from acting upon the convex faces 96 of the turbine blades 84 in the negative flow section 92 of the turbine assembly 64 while allowing fluid flow to act upon the concave faces 94 of the turbine blades 84 in the positive flow section 90 of the turbine assembly 64. The cover 112 is hemispherically shaped and extends spherically between a first cover end 118 supported by a first of the rotor mounts 30 and a second cover end 120 supported by a second of the rotor mounts 30. The first pivot position of the shield 104 is completely nested within the cover 112 in the negative flow section 92 of the wind turbine apparatus.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

ELEMENT LIST

| Element Symbol | Element Name |
| --- | --- |
| A | vertical axis |
| B | turbine axis |
| C | chords |
| D | trunnion axis |
| 20 | support |
| 22 | shaft |
| 24 | foundation |
| 26 | center frame |
| 28 | arms |
| 30 | rotor mounts |
| 32 | bottom end |
| 34 | top end |
| 36 | bearing pin |
| 38 | lower support members |
| 40 | lower mount plate |
| 42 | bushing |
| 44 | lower truss members |
| 46 | lower truss lower ends |
| 48 | lower truss upper ends |
| 50 | lower cross beam |
| 52 | upper mount plate |
| 54 | bearing |
| 56 | bearing pin cap |
| 58 | upper cross beam |
| 60 | bushing assembly opening |
| 62 | bearing assembly opening |
| 64 | turbine assembly |
| 66 | axle |
| 68 | axle bearings |
| 70 | axle openings |
| 72 | electric generators |
| 74 | pulley systems |
| 76 | drive pulley |
| 78 | power take-off pulley |
| 80 | first axle end |
| 82 | second axle end |
| 84 | turbine blades |
| 86 | first ends |

-continued

| Element Symbol | Element Name |
| --- | --- |
| 88 | second ends |
| 90 | positive flow section |
| 92 | negative flow section |
| 94 | concave faces |
| 96 | convex faces |
| 98 | faces |
| R1 | first end radials |
| R2 | second end radials |
| 100 | drive wheel spokes |
| 102 | spoke supports |
| 104 | shield |
| 106 | trunnions |
| 108 | counterweights |
| 110 | controller |
| 112 | cover |
| 114 | first shield end |
| 116 | second shield end |
| 118 | first cover end |
| 120 | second cover end |
| Φ | second angle |
| θ | first angle |

What is claimed is:

1. A wind turbine apparatus reactive to fluid flow for generating energy comprising:
a turbine assembly (64) supported for rotation about a turbine axis (B),
said turbine assembly (64) including at least one turbine blade (84) having a first end (86) disposed on a first end radial (R1) extending radially from said turbine axis (B) along a chord (C) spaced radially from said turbine axis (B) and extending axially from said first end (86) back to a second end (88) on said turbine axis (B) at a position spaced axially along said turbine axis (B) from said first end radial (R1) thereof,
and characterized by
said turbine blade (84) presenting a face (98) defined by said chord (C) and extending from said first end (86) having said chord (C) coincident to said first end radial (R1) to said second end (88) at a varying angle of attack between said first end radial (R1) and said turbine axis (B) to position a portion of said turbine blade (84) perpendicularly to fluid flow at various transverse angles to said turbine axis (B),
said chord (C) of said second end (88) of said turbine blade (84) being coincident to said turbine axis (B) with said turbine blade (84) extending from said turbine axis (B) on a second end radial (R2) and said second end radial (R2) being spaced angularly about said turbine axis (B) by a first angle (θ) from said first end radial (R1).

2. A wind turbine apparatus as set forth in claim 1 wherein said first angle (θ) is greater than zero degrees.

3. A wind turbine apparatus as set forth in claim 1 wherein said first angle (θ) equals forty-five degrees.

4. A wind turbine apparatus as set forth in claim 1 wherein said turbine blade (84) extends from said first end (86) disposed on said first end radial (R1) to said second end (88) disposed on said second end radial (R2) according to the formula $[x, y, z] = [v \cdot \sin(\pi u/2) \cdot \cos(\pi u/2), v \cdot \sin^2(\pi u/2), v \cdot \cos(\pi u/2)]$ wherein x, y, and z are Cartesian coordinates with the y axis being said turbine axis (B) and the x and z axes extending radially from said y axis and perpendicularly to each other where u varies to define the angle through which said turbine blade (84) extends from said first end (86) disposed on said first end radial (R1) about said x axis to said second end (88)

disposed on said second end radial (R2) and where v varies from a first value v1 to a last value vx wherein v1 defines the radial distance along said first end radial (R1) to begin said chord (C) and vx defines the radial distance along said first end radial (R1) to end said chord (C).

5. A wind turbine apparatus as set forth in claim 1 wherein said turbine assembly (64) has a positive flow section (90) and a negative flow section (92) and includes a plurality of turbine blades (84) presenting concave faces (94) in said positive flow section (90) and presenting convex faces (96) in said negative flow section (92) and extending in opposite directions from a plurality of first ends (86) disposed on a plurality of first end radials (R1) spaced angularly about said turbine axis (B) by a second angle (Φ) from each other back to a plurality of second ends (88) disposed on a plurality of second end radials (R2) spaced angularly about said turbine axis (B) by said first angle (θ) from said first end radials (R1).

6. A wind turbine apparatus as set forth in claim 5 wherein said first angle (θ) and said second angle (Φ) are greater than zero degrees.

7. A wind turbine apparatus as set forth in claim 5 wherein said first angle (θ) equals forty-five degrees and said second angle (Φ) equals sixty degrees.

8. A wind turbine apparatus as set forth in claim 5 wherein said turbine assembly (64) includes a fluid flow control assembly (104, 106, 108, 110, 112) for controlling fluid flow acting upon said turbine blades (84).

9. A wind turbine apparatus as set forth in claim 8 wherein said fluid flow control assembly (104, 106, 108, 110, 112) includes a shield (104) supported for rotation about said turbine axis (B) for regulating fluid flow acting upon said concave faces (94) of said turbine blades (84) in said positive flow section (90) of said turbine assembly (64).

10. A wind turbine apparatus as set forth in claim 8 wherein said fluid flow control assembly (104, 106, 108, 110, 112) includes a cover (112) covering said negative flow section (92) of said turbine assembly (64) for preventing fluid flow from acting upon said convex faces (96) of said turbine blades (84) in said negative flow section (92) of said turbine assembly (64) while allowing fluid flow to act upon said concave faces (94) of said turbine blades (84) in said positive flow section (90) of said turbine assembly (64).

11. A wind turbine apparatus as set forth in claim 5 further comprising
a support (20) for supporting said turbine assembly (64) for rotation about a vertical axis (A) transverse to said turbine axis (B) on a foundation (24).

12. A wind turbine apparatus as set forth in claim 11 further comprising
spaced rotor mounts (30) affixed to said support (20) for supporting said turbine assembly (64) for rotation about said turbine axis (B).

13. A wind turbine apparatus as set forth in claim 12 further comprising
a pair of generator assemblies (72, 74) supported by said rotor mounts (30) for generating electrical energy.

14. A wind turbine apparatus as set forth in claim 13 wherein
said vertical axis (A) and said first end radials (R1) define a vertical plane and said plurality of turbine blades (84) extend equally in opposite directions from said vertical plane to said turbine axis (B).

15. A wind turbine apparatus as set forth in claim 14 wherein
said turbine assembly (64) includes an axle (66) extending along said turbine axis (B) and supported by said rotor mounts (30) and operatively connected to said generator assemblies (72, 74) and a drive wheel assembly (100, 102) secured to said axle (66) centrally between said rotor mounts (30) and extending radially from said turbine axis (B) along said vertical plane.

16. A wind turbine apparatus reactive to fluid flow for generating energy comprising:
a support (20) including a shaft (22) having a vertical axis (A) for supporting the wind turbine apparatus on a foundation (24) and a yoke (26, 28) rotatably supported on said shaft (22) for rotation about said vertical axis (A),
said yoke (26, 28) including a center frame (26) rotatably supported on said shaft (22) and a pair of arms (28) extending upwardly in opposite directions from said center frame (26),
spaced rotor mounts (30) each supported by one of said arms (28) of said yoke (26, 28),
a pair of generator assemblies (72, 74) supported by said rotor mounts (30) for generating electrical energy,
a turbine assembly (64) including an axle (66) extending along a turbine axis (B) and supported by said rotor mounts (30) and operatively connected to said generator assemblies (72, 74) and a drive wheel assembly (100, 102) secured to said axle (66) centrally between said rotor mounts (30) and extending radially from said turbine axis (B),
said turbine assembly (64) including a plurality of turbine blades (84) having first ends (86) disposed on first end radials (R1) extending radially from said turbine axis (B) along chords (C) spaced radially from said turbine axis (B) and extending axially in opposite directions from said first ends (86) back to second ends (88) disposed on second end radials (R2) extending radially from said turbine axis (B) adjacent said rotor mounts (30),
said turbine assembly (64) having a positive flow section (90) and a negative flow section (92) wherein said plurality of turbine blades (84) present concave faces (94) defined by said chords (C) in said positive flow section (90) and present convex faces (96) defined by said chord (C) in said negative flow section (92),
said turbine assembly (64) including a fluid flow control assembly (104, 106, 108, 110, 112) for controlling fluid flow acting upon said turbine blades (84),
said fluid flow control assembly (104, 106, 108, 110, 112) including a shield (104) rotatably supported by and extending between said rotor mounts (30) for regulating fluid flow acting upon said concave faces (94) of said turbine blades (84) in said positive flow section (90) of said turbine assembly (64),
said fluid flow control assembly (104, 106, 108, 110, 112) including a cover (112) supported by and extending between said rotor mounts (30) for preventing fluid flow from acting upon said convex faces (96) of said turbine blades (84) in said negative flow section (92) of said turbine assembly (64) while allowing fluid flow to act upon said concave faces (94) of said turbine blades (84) in said positive flow section (90) of said turbine assembly (64),
and characterized by
said turbine blades (84) extending from said first ends (86) having said chords (C) coincident to said first end radials (R1) to said second ends (88) disposed on said second end radials (R2) having chords (C) coincident to said turbine axis (B) at varying angles of attack between said first end radials (R1) and said turbine axis (B) to position a portion of said turbine blades (84) perpendicularly to fluid flow at various transverse angles to said turbine axis (B), said second end radials (R2) being spaced angularly about said turbine axis (B) by a first angle (θ) from said first end radials (R1) and said first end radials (R1) being spaced angularly about said turbine axis (B) by a second angle (Φ) from each other, said first angle (θ) equaling forty-five degrees and said second angle (Φ) equaling sixty degrees, each of said turbine blades (84) extending from said drive wheel assembly (100, 102) to said axle (66) according to the given formula $[x, y, z]=[v \cdot \sin(\pi u/2) \cdot \cos(\pi u/2), v \cdot \sin^2(\pi u/2), v \cdot \cos(\pi u/2)]$ wherein x, y, and z are Cartesian coordinates with the y axis being said turbine axis (B) and the x and z axes extending radially from said y axis and perpendicularly to each other where u varies to define the angle through which said turbine blades (84) extend from said first ends (86) disposed on said first end radials (R1) about said x axis to said second ends (88) disposed on said second end radials (R2) and where v varies from a first value v1 to a last value vx wherein v1 defines the radial distance along said first end radials (R1) to begin said chords (C) and vx defines the radial distance along said first end radials (R1) to end said chords (C), said shaft (22) of said support (20) being cylindrical in shape having a bottom end (32) affixed to said foundation (24) and extending vertically on said vertical axis (A) to a top end (34) and having a bearing pin (36) disposed on said top end (34) of said shaft (22), said center frame (26) including a bushing assembly (38, 40, 42) surrounding said shaft (22) adjacent said bottom end (32) of said shaft (22) and a pair of lower truss members (44) extending in opposite diverging directions from lower truss lower ends (46) at said bushing assembly (38, 40, 42) to lower truss upper ends (48) and a lower cross beam (50) interconnecting said lower truss upper ends (48) and a bearing assembly (52, 54, 56) attached to said lower cross beam (50) on said vertical axis (A) and an upper cross beam (58) extending transversely to and supported on said lower cross beam (50) downstream relative to said vertical axis (A), said bushing assembly (38, 40, 42) including a pair of lower support members (38) spaced from one another and connected to said lower truss lower ends (46) and a lower mount plate (40) interconnecting said lower support members (38) and a bushing (42) affixed to said lower mount plate (40) on said vertical axis (A) between said lower support members (38) and defining a bushing assembly opening (60) through said lower mount plate (40) and said bushing (42) on said vertical axis (A) for allowing said shaft (22) to pass through said bushing assembly opening (60), said bearing assembly (52, 54, 56) including an upper mount plate (52) attached to said lower cross beam (50) and a bearing (54) affixed to said upper mount plate (52) on said vertical axis (A) and defining a bearing assembly opening (62) in said bearing (54) at said vertical axis (A) and a bearing pin cap (56) disposed in said bearing assembly opening (62) for engaging said bearing pin (36) of said shaft (22) and supporting said wind turbine apparatus for rotation about said vertical axis (A), said generator assemblies (72, 74) including a pair of electric generators (72) connected to said rotor mounts (30) and a pair of pulley systems (74) rotatably interconnecting said electric generators (72) to said axle (66), each of said pulley systems (74) including a drive pulley (76) connected to said electric generator (72) and a power take-off pulley (78) connected to said axle (66), a pair of axle bearings (68) supported on said rotor mounts (30) defining a pair of axle openings (70) along said turbine axis (B), said axle (66) being cylindrical in shape having a first axle end (80) affixed to a first of said power take-off pulleys (78) and extending axially through said axle openings (70) in said axle bearings (68) along said turbine axis (B) to a second axle end (82) affixed to a second of said power take-off pulleys (78), said drive wheel assembly (100, 102) including a plurality of drive wheel spokes (100) extending radially outward from said axle (66) perpendicularly to said turbine axis (B) along said first end radials (R1) and a plurality of spoke supports (102) extending between said drive wheel spokes (100), said cover (112) being hemispherically shaped extending spherically between a first cover end (118) supported by a first of said rotor mounts (30) and a second cover end (120) supported by a second of said rotor mounts (30), said fluid flow control assembly (104, 106, 108, 110, 112) including a pair of trunnions (106) supported by said rotor mounts (30) and having a trunnion axis (D) extending between said trunnions (106) and concentric to said turbine axis (B) and a pair of counterweights (108) and a controller (110), said shield (104) being semi-spherically shaped extending spherically between a first shield end (114) pivotally affixed to a first of said trunnions (106) and a second shield end (116) pivotally affixed to a second of said trunnions (106) for allowing said shield (104) to pivot about said trunnion axis (D) in a plurality of pivot positions between a first position with said shield (104) being fully nested in said negative flow section (92) of said turbine assembly (64) and a last position with said shield (104) being fully exposed in said positive flow section (90) of said turbine assembly (64), said pair of counterweights (108) being affixed to said shield (104) adjacent to said trunnions (106) for balancing said shield (104) in said plurality of pivot positions, said controller (110) being affixed to said shield (104) between one of said trunnions (106) and one of said counterweights (108).

* * * * *

UNITED STATES PATENT AND TRADEMARK OFFICE
CERTIFICATE OF CORRECTION

| | | |
|---|---|---|
| PATENT NO. | : 7,887,283 B1 | Page 1 of 1 |
| APPLICATION NO. | : 12/881698 | |
| DATED | : February 15, 2011 | |
| INVENTOR(S) | : James Michael Mongan | |

It is certified that error appears in the above-identified patent and that said Letters Patent is hereby corrected as shown below:

Column 10, line 15: "a pair of axle hearings (68)" should read -- a pair of axle bearings (68) --;

Signed and Sealed this
Twelfth Day of April, 2011

David J. Kappos
*Director of the United States Patent and Trademark Office*